April 5, 1960 O. D. ADKINS 2,931,549
SPARE TIRE RACK
Filed Sept. 26, 1958 2 Sheets-Sheet 1
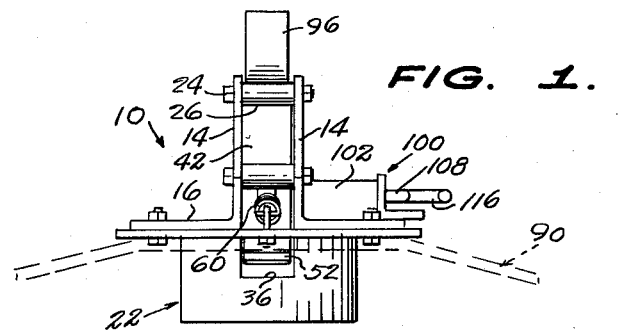
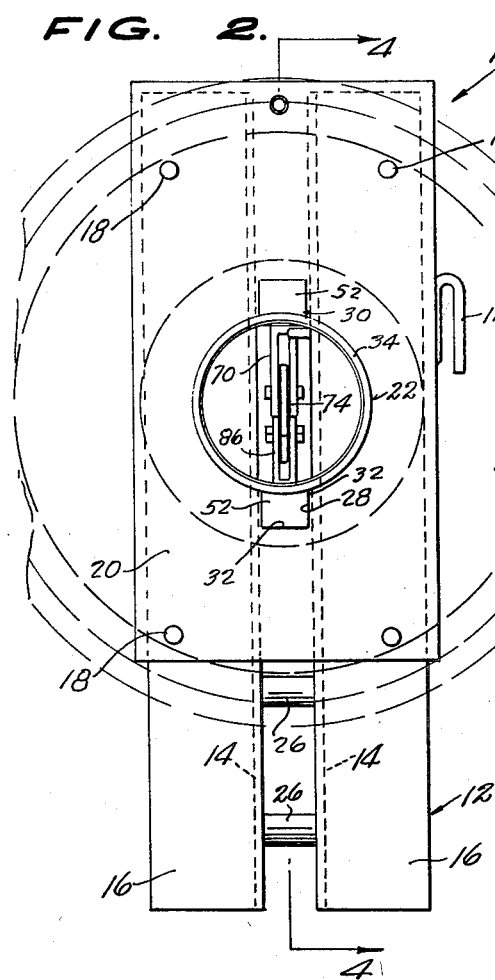
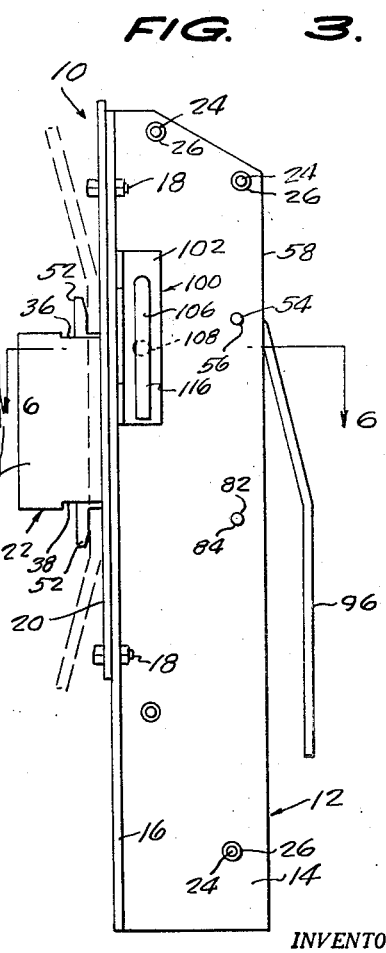
INVENTOR.
OREL D. ADKINS,
BY
McMorrow, Berman & Davidson
ATTORNEYS.

April 5, 1960  O. D. ADKINS  2,931,549
SPARE TIRE RACK

Filed Sept. 26, 1958  2 Sheets-Sheet 2

INVENTOR.
OREL D. ADKINS,
BY
McMorrow, Berman & Davidson
ATTORNEYS.

United States Patent Office 2,931,549
Patented Apr. 5, 1960

2,931,549

SPARE TIRE RACK

Orel D. Adkins, Snyder, Tex.

Application September 26, 1958, Serial No. 763,635

4 Claims. (Cl. 224—42.24)

This invention relates to an improved vehicle spare tire rack involving lever-operated wheel clamping jaws on a wheel supporting hub.

The primary object of the invention is to provide a more efficient, reliable, and easily used device of the character indicated which has wheel clamping jaws which are spring-urged to wheel clamping positions from within a wheel supporting hub, the jaws being articulated to work together in opposite directions, manual locking means for locking the jaws in either retracted or clamping position, and a hand lever on one of the jaws for retracting the jaws, the jaws, the hub, and the lever being supported on a support which is adapted to be bolted or welded in a variety of locations and positions on a vehicle, such as within the trunk compartment, in an erect or in an inverted horizontal position, or upon a spare tire stand, as of the "continental" type.

Another object of the invention is to provide a device of the character indicated above which is simple in construction, composed of a small number of uncomplex and easily assembled parts, and which can be made in rugged and serviceable forms at relatively low cost.

Other important objects and advantageous features of the invention will be apparent from the following description and the accompanying drawings, wherein, for purposes of illustration only, a specific form of the invention is set forth in detail.

In the drawings:

Figure 1 is a top plan view of a device of the invention, a wheel clamped thereon being shown fragmentarily in phantom lines;

Figure 2 is a front elevation of Figure 1;

Figure 3 is a right hand side elevation of Figure 2;

Figure 4:
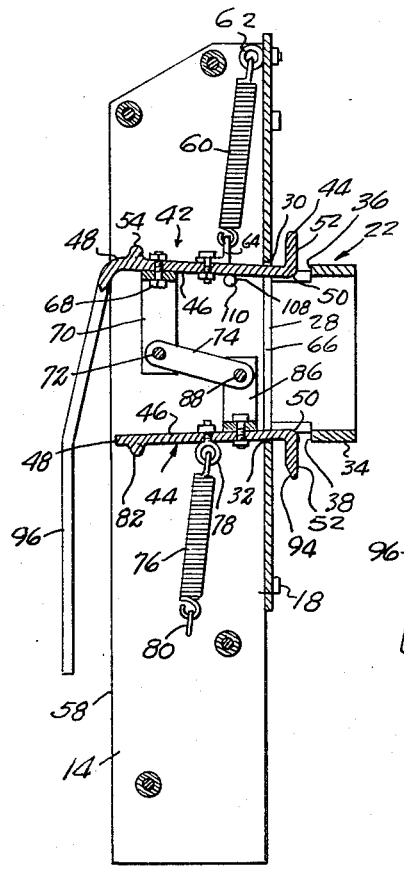
Figure 4 is a vertical transverse section taken on the line 4—4 of Figure 2, the clamping jaws being shown in clamping positions.

Referring in detail to the drawings, wherein like numerals designate like parts throughout the several views, the illustrated device, generally designated 10, comprises an elongated frame 12, to be secured to a support (not shown) such as a component of an automobile trunk compartment, in an erect or horizontal and inverted position, or upon an external tire stand, as in a "continental" tire mounting, with appropriate modifications of the frame. The frame 12 has a pair of similar angle iron uprights or standards having parallel rearwardly extending flanges 14 which are spaced and registered with respect to each other, and laterally extending flanges 16 which project in opposite outward directions and are in the same vertical plane. Fixed to the forward sides of the lateral flanges 16, preferably at the upper part of the frame 12, as by bolts 18, is a hub mounting plate 20, having fixed centralized thereon a forwardly projecting hollow cylindrical wheel supporting hub 22. At upper and lower end portions, the parallel flanges 14 are spaced and connected by means of pairs of bolts 24, on which are spacer sleeves 26 reaching between the flanges 14.

Formed in the hub mounting plate 20 and registered with the hub 22 is a vertically elongated diametrical jaw guiding slot 28 having upper and lower stop or abutment edges 30 and 32, respectively, which are substantially on the levels of the upper and lower sides, respectively, of the hub side wall 34. The hub side wall 34 is formed at the rear end of the hub 22 with upper and lower relatively short longitudinal jaw-receiving slots 36 and 38, respectively, which are registered with the slot 28 in the mounting plate 20.

Mounted on and located between the parallel frame flanges 14 is a clamping jaw assembly 40, comprising upper and lower jaws 42 and 44, respectively. The jaws are reversed with respect to each other, and each jaw comprises a straight flat bar 46 having a rear end 48 and a forward end 50, the forward end having fixed thereon a lateral dog 52.

Figure 5:
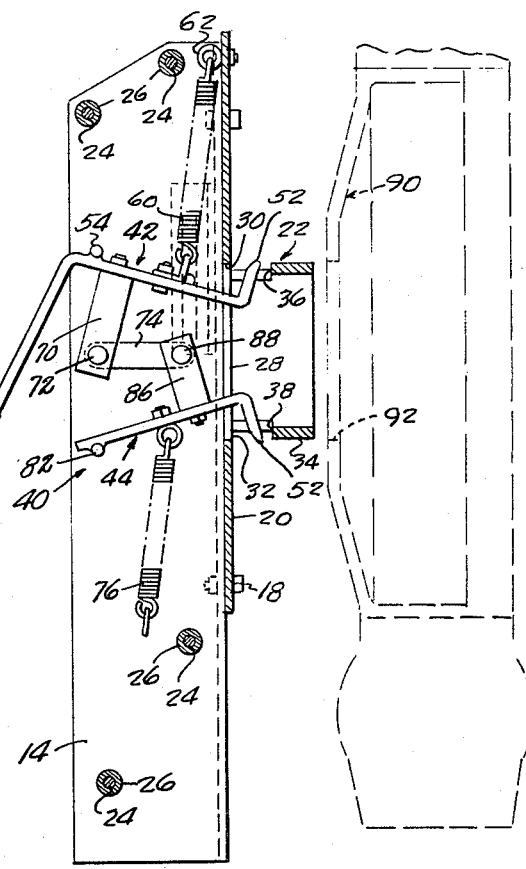
Figure 5 is a view similar to Figure 4, showing the clamping jaws in retracted positions so as to clear the hub for the removal or the reception of a wheel, shown in phantom lines thereon.

As shown in Figures 4 and 5, the upper jaw 42 has fixed on its upper side near its rear end a transverse axle or hinge pin 54 whose ends are journaled through holes 56 in the parallel frame flange 14 at points near the rear edges 58 of the flanges 14 and on a level slightly above the upper edge 30 of the jaw guiding slot 28, so that the forward part of the upper jaw extends forwardly through the guiding slot 28, with its dog 52 directed upwardly through the upper receiving slot 36 in the hub side wall 34; and so that the upper jaw 42 is in a slightly forwardly declining position when in stop engagement with the upper edge 30 of the guiding slot 28, as shown in Figure 4. An upper contractile coil spring 60 is stretched between an eye bolt 62 on the mounting plate 20 above the slot 28, and an ear 64 secured upon an intermediate part of the upper jaw, whereby the upper jaw is yieldably pivoted upwardly toward its clamping position in engagement with the upper stop edge 30 of the guiding slot 28. The widths of the jaws can be such that they have guided engagement with the side edges 66 of the slot 28.

Fixed, as indicated at 68, on and depending from the underside of the upper jaw bar 46, at a point between the pivot pin 54 and the ear 64 is a bifurcated link 70 which is traversed at its lower end by a pivot pin 72, on which is pivotally secured the rear end of a generally horizontal link 74.

The lower clamping jaw 44 is similar to but reversed with respect to the upper jaw 42, and its bar 46 works guidingly through the slot 28 and is yieldably urged downwardly toward stop engagement with the lower stop edge 32 of the slot 28 by a lower contractile coil spring 76. The spring 76 is stretched between an eye bolt 78 on an intermediate part of the lower jaw 44 and an eye bolt 80 secured to one of the parallel frame flanges 14 at a point below the jaw 44.

The lower jaw 44 has on the underside of its bar 46 at the rear end thereof a hinge pin or axle 82 whose ends are journaled in holes 84 in the frame flanges 44 near the rear edges 58 thereof, and substantially in vertical alignment with the pin 54 of the upper jaw 42. Fixed on and rising from the lower jaw 44 is a clevis or bifurcated link 86, which is forwardly displaced relative to the depending link 70 of the upper jaw 42. The upper end of the lower jaw link 86 is traversed by a pivot pin 88 which serves to pivotally connect the forward end of the link to the lower jaw link 86, whereby tilting of either of the jaws in one direction rocks the jaws toward each other and tilting of a jaw in the opposite direction rocks the jaws away from each other. It is to be noted that the link 70, link 74, and link 86, constitute linkage means which operatively connect the jaws 42 and 44 together for movement in opposite directions relative to each other between spread and contracted positions.

As shown in Figure 4, the dogs 52 of the upper and lower jaws 42 and 44 are located on the bars 46 so that, in the expanded clamping positions of the jaws, the dogs extend in opposite directions through the hub slots 36 and 38 and are parallel spaced from the forward side of the hub mounting plate 20 at distances not substantially greater than the thickness of the material of a vehicle wheel disc 40 around the wheel opening 92, so that the disc 90 is clamped between the forward side of the hub mounting plate 20 and the dogs 52 when the wheel disc 90 is on the hub 22 and the jaws 42 and 44 have been permitted to be expanded to their clamping positions by the action of the springs 60 and 76.

In order to avoid harsh contacts and to produce a limited wedging action of the dogs 52 on the wheel disc 90, the tips of the dogs 52 are beveled, as indicated at 94.

For contracting the jaws 42 and 44 toward each other from clamping positions, to the wheel releasing positions shown in Figure 5, one of the jaws, preferably the upper jaw 42 is provided on its rear end with a rigidly connected hand lever 96 which extends downwardly and spacedly along the rear side of the frame 12.

Figure 6:
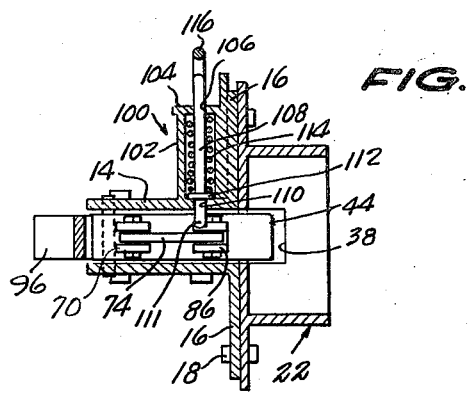
Figure 6 is a horizontal section taken on the line 6—6 of Figure 3.

For holding the jaws in contracted positions, as shown in Figure 5, and hold the device in readiness to receive a wheel disc 90 on the hub 22 or to facilitate removal of a wheel disc from the hub 22, there is provided on the flange 14 of one of the frame standards, a manually releasable jaw locking assembly, generally designated 100, which comprises a vertically elongated housing 102 suitably secured to the outer side of the related flange 14 and bearing against the related flange 16, as shown in Figure 6.

The housing 102 has an outer vertical wall 104 provided with a vertical slot 106 through which extends a locking pin 108 which slidably confined in the slot 106 for horizontal and endwise movements relative to the housing 102 and the related flange 14, which has a hole 110, registered with the lower end of the slot 106, and through which the inner end of the locking pin 108 can slide to engage its terminal 111 with the underside of the upper jaw 42 at a point forwardly of the connection of the upper spring 60, so as to hold the jaws 42 and 44 in their expanded clamping positions, against the resistance of the springs 60 and 76, so that a wheel disc 90 is securely clamped on the hub 22 for tire changing operations.

The locking pin 108 has fixedly circumposed thereon a washer 112 and a coil spring 114 is compressed between the washer 112 and the outer housing wall 104. Thus, when the locking pin 108 is withdrawn from beneath the upper jaw 42 and from the hole 110 in flange 14 against the resistance of the spring 114 by means of an inverted U-shaped handle 116 on the outer end of the locking pin 108, the locking pin is adapted to be moved upwardly along the housing slot 106 to a neutral position, in which it is frictionally retained by the frictional engagement of the pin terminal 111 with the outer side of the related frame flange 14 produced by the action of the spring 114.

From the foregoing it will be evident that preparation of the device of the invention for reception of a wheel disc 90 on the hub requires merely pulling the hand lever 96 rearwardly away from the frame 12, with the locking pin 108 in withdrawn position. After engaging the wheel disc 90 on the hub 22, clamping of the wheel disc 90 on the rack 10 requires only letting go of the hand lever 96 to enable the jaws to expand to clamping relations with the wheel disc 90, followed by sliding of the locking pin 108 so as to engage the terminal 111 beneath the upper jaw 42, so as to lock the jaws in clamping relation to the wheel disc. The wheel disc 90 is thereby firmly and securely supported on the rack 10.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A spare wheel rack comprising a frame having a pair of spaced side flanges, a hub-mounting plate fixed on said frame and extending across the space between said flanges, said plate having therein a jaw-guiding slot extending lengthwise of said flanges, a hollow wheel disc supporting hub fixed on one side of said mounting plate around said slot, said hub having a side wall provided with dog receiving slots registered with and opening severally into the ends of said jaw-guiding slot, first and second jaws positioned between and pivoted on said flanges at the side of the mounting plate remote from the hub and at points spaced along the flanges, said jaws having free end portions reaching through and engaging said jaw-guiding slot and into the interior of said hub, said free end portions having lateral dogs thereon which extend out through and work in said dog-receiving slots, jaw-spreading spring means on said frame acting to spread the jaws, said jaw-guiding slot having stop edges at its ends with which the jaws have stop engagement in the spread condition of the jaws, and means for contracting the jaws against the resistance of said spring means, said contracting means comprising linkage means operatively connecting the jaws together for movements in opposite directions relative to each other between spread and contracted positions, and a hand lever fixed on one of the jaws.

2. A spare wheel rack comprising a frame having a pair of spaced side flanges, a hub-mounting plate fixed on said frame and extending across the space between said flanges, said plate having therein a jaw-guiding slot extending lengthwise of said flanges, a hollow wheel disc supporting hub fixed on one side of said mounting plate around said slot, said hub having a side wall provided with dog receiving slots registered with and opening severally into the ends of said jaw-guiding slot, first and second jaws positioned between and pivoted on said flanges at the side of the mounting plate remote from the hub and at points spaced along the flanges, said jaws having free end portions reaching through and engaging said jaw-guiding slot and into the interior of said hub, said free end portions having lateral dogs thereon which extend out through and work in said dog-receiving slots, jaw-spreading spring means on said frame acting to spread the jaws, said jaw-guiding slot having stop edges at its ends with which the jaws have stop engagement in the spread condition of the jaws, and means for contracting the jaws against the resistance of said spring means, said contracting means comprising linkage means operatively connecting the jaws together for movements in opposite directions relative to each other between spread and contracted positions, and a hand lever fixed on one of the jaws, said linkage means comprising link members fixed on said jaws at points spaced therealong in the space between the pivotal axes of the jaws and said mounting plate, and a link extending between and pivoted at opposite ends to said link members.

3. A spare wheel rack comprising a frame having a pair of spaced side flanges, a hub-mounting plate fixed on said frame and extending across the space between said flanges, said plate having therein a jaw-guiding slot extending lengthwise of said flanges, a hollow wheel disc supporting hub fixed on one side of said mounting plate around said slot, said hub having a side wall provided with dog receiving slots registered with and opening severally into the ends of said jaw-guiding slot, first and second jaws positioned between and pivoted on said flanges at the sides of the mounting plate remote from the hub and at points spaced along the flanges, said jaws having free end portions reaching through and engaging said jaw-guiding slot and into the interior of said hub, said free end portions having lateral dogs thereon which extend out through and work in said dog-receiving slots, jaw-spreading spring means on said frame acting to spread the jaws, said jaw-guiding slot having stop edges at its ends with which the jaws have stop engagement in the spread condition of the jaws, and means for contracting the jaws against the resistance of said spring means, said contracting means comprising linkage means operatively connecting the jaws together for movements in opposite directions relative to each other between spread and contracted positions, and a hand lever fixed on one of the jaws, said jaws having facing sides, and means for locking said jaws in spread condition comprising a locking pin sliding through a hole provided in one side flange, said pin having an inner end located to engage the facing side of a jaw in an inwardly moved operative position of the pin while the jaws are in spread condition.

4. A spare wheel rack comprising a frame having a pair of spaced side flanges, a hub-mounting plate fixed on said frame and extending across the space between said flanges, said plate having therein a jaw-guiding slot extending lengthwise of said flanges, a hollow wheel disc supporting hub fixed on one side of said mounting plate around said slot, said hub having a side wall provided with dog receiving slots registered with and opening severally into the ends of said jaw-guiding slot, first and second jaws positioned between and pivoted on said flanges at the sides of the mounting plate remote from the hub and at points spaced along the flanges, said jaws having free end portions reaching through and engaging said jaw-guiding slot and into the interior of said hub, said free end portions having lateral dogs thereon which extend out through and work in said dog-receiving slots, jaw-spreading spring means on said frame acting to spread the jaws, said jaw-guiding slot having stop edges at its ends with which the jaws have stop engagement in the spread condition of the jaws, and means for contracting the jaws against the resistance of said spring means, said contracting means comprising linkage means operatively connecting the jaws together for movements in opposite directions relative to each other between spread and contracted positions, and a hand lever fixed on one of the jaws, said jaws having facing sides, and means for locking said jaws in spread condition comprising a locking pin sliding through a hole provided in one side flange, said pin having an inner end located to engage the facing side of a jaw in an inwardly moved operative position of the pin while the jaws are in spread condition, positioning spring means urging said locking pin toward its operative position, and handle means located at the outward side of said one side flange for withdrawing the locking pin from operative position against the resistance of said positioning spring means.

References Cited in the file of this patent
UNITED STATES PATENTS

| | | |
|---|---|---|
| 1,327,742 | Steel et al. | Jan. 13, 1920 |
| 1,896,629 | Julian | Feb. 7, 1933 |
| 1,931,080 | Nehls | Oct. 17, 1933 |
| 1,947,820 | Alborn | Feb. 20, 1934 |
| 2,471,642 | Moltz | May 31, 1949 |